UNITED STATES PATENT OFFICE.

GUSTAF W. ELMEN, OF LEONIA, NEW JERSEY, ASSIGNOR TO WESTERN ELECTRIC COMPANY, INCORPORATED, OF NEW YORK, N. Y., A CORPORATION OF NEW YORK.

METHOD OF INSULATING METAL PARTICLES.

1,383,703.     Specification of Letters Patent.     Patented July 5, 1921.

No Drawing.     Application filed January 21, 1920. Serial No. 353,102.

*To all whom it may concern:*

Be it known that I, GUSTAF W. ELMEN, a citizen of the United States, residing at Leonia, in the county of Bergen and State of New Jersey, have invented certain new and useful Improvements in Methods of Insulating Metal Particles, of which the following is a full, clear, concise, and exact description.

This invention relates to a method of coating metal particles with insulating material, and particularly to the coating of particles used in the manufacture of magnet cores of the general type described and claimed in United States patents to Speed No. 1,274,952 and Elmen No. 1,286,965. The present process may be considered an improvement on the coating processes described in these patents and in United States patent to Woodruff No. 1,292,206. In the magnet cores described in the Speed and Elmen patents, the particles are coated with red iron oxid. In the core of the Woodruff patent, the particles are partially coated with a metal different from the particles and then with a solution of shellac from which the alcohol is afterward evaporated; a method which experience seems to indicate results in producing a coating which is mostly black iron oxid.

The present invention is the result of the discovery that red iron oxid does not adhere as firmly to the particles and form as satisfactory a coating as black iron oxid; and the further discovery that an insulating coating of black iron oxid may be created on the surfaces of the particles without the use of a coating metal and without the use of shellac as described in the Woodruff patent.

The method will be described as applied to iron particles, but it is to be understood that it is equally applicable for producing an adherent coating of oxid on particles of other materials, such as cobalt, nickel, and alloys generally.

In carrying out the method, the iron particles to be coated are mixed with only enough of an oxidizing agent, such as water or a weak solution of hydrogen peroxid, to produce a black oxid on the surface of the particles, but not sufficient to change the particles completely into oxid, or even to create a surface coating of red oxid. The mixture of iron particles and oxidizing agent is placed in a container which is heated and in which the mass is stirred or tumbled until the surfaces of the particles are completely coated with black oxid and the oxidizing agent is exhausted. After cooling, the container may be opened and the coated iron particles removed.

The proportion of oxidizing agent to iron particles and the temperature to which the container should be heated will depend principally upon the size and character of the particles. If the particles to be coated are of electrolytic iron and if they are of approximately the size described in the Speed, Elmen and Woodruff patents above mentioned, that is, of a size which will pass through an 80-mesh screen, the oxidizing agent may be water or a $3\frac{1}{2}$ per cent. solution of hydrogen peroxid in the proportion of about 200 cc. of oxidizing agent to about 14 kg. of iron particles. The temperature of the container during the oxidizing process may be approximately 225° F. when unannealed electrolytic iron is to be covered; and about 350° F. when annealed electrolytic iron is to be coated. The difference in the temperatures used for unannealed and for annealed electrolytic iron is due to the fact that the former begins to change its magnetic properties when heated above approximately 250° F. Ordinarily, it will be sufficient if the heating and stirring of the mixture of the particles and oxidizing agent is carried on for about 48 hours.

What is claimed is:

1. The method of coating metallic particles which consists in mixing with a mass of said particles only sufficient oxidizing agent to form a black oxid on the surfaces of said particles, and heating the mixture in a container until oxidation of the surfaces of the particle has taken place.

2. The method of coating metallic particles which consists in mixing with a mass of said particles only sufficient oxidizing agent to form a black oxid on the surfaces of said particles, and heating and stirring the mixture in a container until oxidation of the surfaces of the particles has taken place.

3. The method of coating metallic particles which consists in mixing with a mass of said particles only sufficient oxidizing agent to form a black oxid on the surfaces of said particles, and heating the mixture in a container to a temperature below that at which the magnetic properties of the material change until oxidation of the surfaces of the particles has taken place.

4. The method of coating iron particles with black oxid which consists in mixing a mass of said particles with only sufficient oxidizing agent to form a black oxid on the surfaces of said particles, and heating the mixture in a container to a temperature of approximately 225° F. until oxidation of the surfaces of the particles has taken place.

In witness whereof, I hereunto subscribe my name this 16th day of January, A. D., 1920.

GUSTAF W. ELMEN.